United States Patent
Liu et al.

(10) Patent No.: US 10,657,923 B2
(45) Date of Patent: May 19, 2020

(54) DISPLAY CONTROL CIRCUIT, DISPLAY CONTROL METHOD THEREOF, AND DISPLAY APPARATUS

(71) Applicants: BOE Technology Group Co., Ltd., Beijing (CN); Beijing BOE Optoelectronics Technology Co., Ltd., Beijing (CN)

(72) Inventors: Nan Liu, Beijing (CN); Na An, Beijing (CN); Xin Wang, Beijing (CN); Xiaoping Zhang, Beijing (CN); Ying Liu, Beijing (CN); Yaodong Wang, Beijing (CN); Fangyi Liu, Beijing (CN); Yang Zhang, Beijing (CN); Yangli Zheng, Beijing (CN)

(73) Assignees: BOE TECHNOLOGY GROUP CO., LTD., Beijing (CN); BEIJING BOE OPTOELECTRONICS TECHNOLOGY CO., LTD., Beijing (CN)

( * ) Notice: Subject to any disclaimer, the term of this patent is extended or adjusted under 35 U.S.C. 154(b) by 210 days.

(21) Appl. No.: 15/568,310

(22) PCT Filed: Mar. 13, 2017

(86) PCT No.: PCT/CN2017/076441
§ 371 (c)(1),
(2) Date: Oct. 20, 2017

(87) PCT Pub. No.: WO2018/058902
PCT Pub. Date: Apr. 5, 2018

(65) Prior Publication Data
US 2018/0301109 A1    Oct. 18, 2018

(30) Foreign Application Priority Data
Sep. 27, 2016   (CN) .......................... 2016 1 0857025

(51) Int. Cl.
*G09G 5/00*       (2006.01)
*G06F 1/26*       (2006.01)
(Continued)

(52) U.S. Cl.
CPC ............... *G09G 5/003* (2013.01); *G06F 1/26* (2013.01); *G06F 1/3218* (2013.01);
(Continued)

(58) Field of Classification Search
CPC ............ G09G 5/003; G09G 3/00; G09G 5/00; G09G 2330/022; G09G 2330/02;
(Continued)

(56) References Cited

U.S. PATENT DOCUMENTS 9,075,613 B2    7/2015  Chen et al.
2007/0130479 A1*  6/2007  Price .......................... G06F 1/26
                                                                        713/300
(Continued)

FOREIGN PATENT DOCUMENTS

CN       1766977 A       5/2006
CN     101441860 A       5/2009
(Continued)

OTHER PUBLICATIONS

International Search Report and Written Opinion and English Translation of International Search Report and Written Opinion from International Patent Application No. PCT/CN2017/076441, dated Mar. 13, 2017, 19 pages.

*Primary Examiner* — Andrew Sasinowski
(74) *Attorney, Agent, or Firm* — Westman, Champlin & Koehler, P.A.

(57) ABSTRACT

The embodiments of the present disclosure propose a display control circuit, a display control method thereof and a display apparatus, so that power supply to the display driving circuit is controlled to be disabled when the display (Continued)

driving circuit is in the sleep-in mode and is controlled to be enabled when the display driving circuit is in the wakeup mode by setting a switch circuit in the display control circuit and turning on and turning off the switch circuit.

20 Claims, 4 Drawing Sheets

(51) Int. Cl.
*G09G 3/00* (2006.01)
*G06F 1/3218* (2019.01)
*G06F 1/3234* (2019.01)
*G06F 3/041* (2006.01)
*G06F 1/3287* (2019.01)

(52) U.S. Cl.
CPC .......... *G06F 1/3265* (2013.01); *G06F 1/3287* (2013.01); *G06F 3/0416* (2013.01); *G09G 3/00* (2013.01); *G09G 5/00* (2013.01); *G09G 2310/061* (2013.01); *G09G 2330/02* (2013.01); *G09G 2330/021* (2013.01); *G09G 2330/022* (2013.01); *G09G 2330/026* (2013.01); *G09G 2330/027* (2013.01)

(58) Field of Classification Search
CPC ....... G09G 2330/027; G09G 2330/026; G09G 2330/021; G09G 2310/061; G06F 3/0416; G06F 1/26
See application file for complete search history.

(56) References Cited

U.S. PATENT DOCUMENTS

| | | | |
|---|---|---|---|
| 2009/0153236 A1* | 6/2009 | Kneepkens | ............... G06F 1/26 327/544 |
| 2009/0284500 A1 | 11/2009 | Yamashita | |
| 2012/0221876 A1 | 8/2012 | Chen et al. | |
| 2015/0271753 A1 | 9/2015 | Matsuda | |
| 2016/0103476 A1* | 4/2016 | Kim | ........................ G06F 3/038 345/1.3 |

FOREIGN PATENT DOCUMENTS

| | | |
|---|---|---|
| CN | 101581863 A | 11/2009 |
| CN | 102650904 A | 8/2012 |
| CN | 102999216 A | 3/2013 |
| CN | 106383611 A | 2/2017 |

\* cited by examiner

US 10,657,923 B2

DISPLAY CONTROL CIRCUIT, DISPLAY CONTROL METHOD THEREOF, AND DISPLAY APPARATUS

CROSS-REFERENCE TO RELATED APPLICATION

The present application is a Section 371 National Stage Application of International Application No. PCT/CN2017/076441, filed Mar. 13, 2017, which has not yet published, and claims priority to the Chinese Patent Application No. 201610857025.2, filed on Sep. 27, 2016, which are incorporated herein by reference in their entirety.

TECHNICAL FIELD

The present disclosure relates to the field of display driving, and more particularly, to a display control circuit, a display control method thereof, and a display apparatus.

BACKGROUND

With the progress of display technology, users have increasing requirements for electronic devices. When an electronic device is in a standby state, the display module may enter a sleep-in mode. In this case, a driving Integrated Circuit (IC) in the display module may be abnormal due to other factors (for example, in a case that the electronic device is switched from a battery-powered state to a USB-powered state, an Application Program (AP) is required to switch a power supply source thereof from a battery to a USB interface, and if there is a linking problem in the switch process, an uncontrollable abnormal power-down condition may transiently occur), which thus causes the display module to enter an abnormal state. For a driving IC in the display module, it needs to turn off an operating power supply voltage IOvcc which supplies power to the driving IC so as to release the driving IC from the abnormal state; otherwise, it may result in that an internal oscillator in the driving IC cannot be restarted, and therefore the display panel has a black screen or abnormal display during a wakeup process. However, in the conventional technology, as IOvcc is further multiplexed by other modules (for example, a touch module), IOvcc cannot be turn off in order to maintain normal operation of other modules.

Therefore, how to solve the problem that the display module has a black screen or abnormal display during a restart process while ensuring that other modules operate properly is one of the technical problems to be solved in the art.

SUMMARY

The embodiments of the present disclosure provide a display control circuit, comprising: a switch circuit having a first signal input terminal connected to a control terminal, a second signal input terminal connected to a power supply signal terminal and a power supply signal output terminal; and a display driving circuit having a first signal input terminal connected to the control terminal, a power supply signal input terminal connected to the power supply signal output terminal of the switch circuit and a driving signal output terminal, wherein the switch circuit is configured to receive an operating power supply voltage from the power supply signal terminal via the second signal input terminal and output the operating power supply voltage to the display driving circuit via the power supply signal output terminal under the control of the control terminal.

In an embodiment, the display control circuit further comprises a main circuit including: the control terminal configured to provide a control signal to the switch circuit and the display driving circuit; and the power supply signal terminal configured to provide the operating power supply voltage.

In an embodiment, the main circuit is configured to: control the switch circuit to be turned off via the control terminal in a sleep-in mode; and control the switch circuit to be turned on via the control terminal in a wakeup mode.

In an embodiment, the switch circuit is configured to: output the operating power supply voltage to the display driving circuit when being turned on, and stop outputting the operating power supply voltage to the display driving circuit when being turned off.

In an embodiment, the main circuit is further configured to control the display driving circuit to be reset via the control terminal.

In an embodiment, the display control circuit further comprises a touch circuit including: a voltage signal input terminal connected to the power supply signal terminal and configured to receive the operating power supply voltage from the main circuit.

In an embodiment, the switch circuit comprises an N-channel Metal Oxide Semiconductor (NMOS) transistor or a P-channel Metal Oxide Semiconductor (PMOS) transistor.

According to another aspect of the embodiments of the present disclosure, there is provided a display control method applicable to the display control circuit described above, comprising:
controlling the switch circuit to be turned off in a sleep-in mode; and
controlling the switch circuit to be turned on in a wakeup mode, so as to provide an operating power supply voltage to the display driving circuit.

In an embodiment, controlling the switch circuit to be turned off comprises: switching a control signal provided via the control terminal from a first level to a second level.

In an embodiment, controlling the switch circuit to be turned on comprises: switching the control signal from the second level to the first level.

In an embodiment, when the control signal is switched from the second level to the first level, the display driving circuit is further controlled to be reset.

According to another aspect of the embodiments of the present disclosure, there is provided a display apparatus comprising a display panel and the display control circuit described above. The display driving circuit is configured to provide a driving signal to the display panel via the driving signal output terminal of the display driving circuit.

BRIEF DESCRIPTION OF THE DRAWINGS

The foregoing and other purposes, features and advantages of the present disclosure will become more apparent from the following description of the preferred embodiments of the present disclosure when taken in conjunction with the accompanying drawings in which.

DETAILED DESCRIPTION

Figure 1:
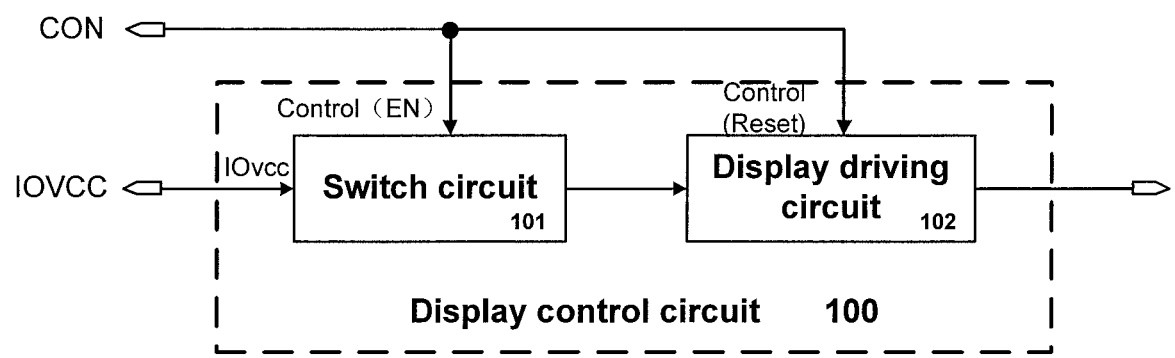
FIG. 1 is a schematic block diagram of a display control circuit according to an embodiment of the present disclosure.

In order to make the purposes, technical solutions and advantages of the embodiments of the present disclosure more clear, the embodiments of the present disclosure will be described in further detail below from the following detailed description with reference to the accompanying drawings, in which the same or similar reference numerals are used to refer to the same or similar technical features. It is obvious that the described embodiments are merely a part of the embodiments of the present disclosure and should not be construed as limiting the present disclosure. All other embodiments obtained by those of ordinary skill in the art based on embodiments of the present disclosure without making any creative work are within the protection scope of the present disclosure.

Throughout the specification, the reference to "one embodiment," "an embodiment," "one example" or "an example" means that the specific features, structures or properties described in conjunction with the embodiment or example are included in at least one embodiment of the present disclosure. Therefore, the phrases "in one embodiment," "in an embodiment," "in one example" or "in an example" occurred in various positions throughout the specification may not necessarily refer to the same embodiment or example. Furthermore, specific features, structures or properties may be combined into one or more embodiments or examples in any appropriate combination and/or sub-combination. Moreover, it should be understood by those skilled in the art that the term "and/or" used herein means any and all combinations of one or more listed items.

According to the embodiments of the present disclosure, the present disclosure proposes a display control circuit, a display control method thereof and a display apparatus, so that power supply to the display driving circuit is controlled to be disabled when the display driving circuit is in a sleep-in mode and is controlled to be enabled when the display driving circuit is in a wakeup mode by setting a switch circuit and accordingly turning on and turning off the switch circuit. Specifically, when it is detected that the display driving circuit is in the sleep-in mode, a control signal is switched from a first level (for example, a high level) to a second level (for example, a low level) to turn off the switch circuit, so as to stop supplying power to the display driving circuit. When the display driving circuit is waked up, the control signal is switched from the second level to the first level to turn on the switch circuit, so as to supply power to the display driving circuit. This prevents the display apparatus from having a black screen or undesirable abnormality display during a restart process due to an abnormal state of the display driving circuit in the sleep-in mode while ensuring that other modules which multiplex a power supply with the display control circuit operate normally.

FIG. 1 illustrates a schematic block diagram of a display control circuit 100 according to an embodiment of the present disclosure. As shown in FIG. 1, the display control circuit 100 according to the embodiment of the present disclosure may comprise a switch circuit 101 and a display driving circuit 102.

The switch circuit 101 has a first signal input terminal connected to a control terminal CON and configured to receive a control signal Control, a second signal input terminal connected to a power supply signal terminal IOVCC and configured to receive an operating power supply voltage IOvcc, and a power supply signal output terminal configured to output the operating power supply voltage.

The display driving circuit 102 has a first signal input terminal connected to the control terminal CON and configured to receive the control signal Control, a power supply signal input terminal connected to the power supply signal output terminal of the switch circuit 101 and configured to receive the operating power supply voltage IOvcc, and a driving signal output terminal configured to output a driving signal.

The switch circuit 101 is configured to output the operating power supply voltage IOvcc received by the second signal input terminal thereof from the power supply signal terminal IOVCC to the display driving circuit 102 under the control of the control terminal CON. In an embodiment, the switch circuit 101 is turned on when the control signal Control is at a first level to output the operating power supply voltage IOvcc to the display driving circuit 102 and is turned off when the control signal Control is at a second level to stop outputting the operating power supply voltage IOvcc to the display driving circuit 102. In the present embodiment, power supply to the display driving circuit is controlled to be disabled when the display driving circuit is in the sleep-in mode and is controlled to be enabled when the display driving circuit is in the wakeup mode by turning on and turning off the switch circuit. In this way, it prevents the display apparatus from having a black screen or undesirable abnormal display during a restart process due to an abnormal state of the display driving circuit in the sleep-in mode. Specifically, when the first level is a high level, the second level is a low level; and when the first level is a low level, the second level is a high level.

Figure 2:
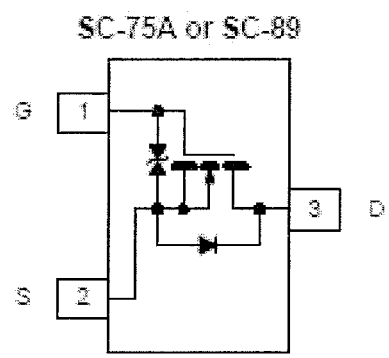
FIG. 2 is an example detailed circuit diagram of a switch circuit in the display control circuit in FIG. 1 according to an embodiment of the present disclosure.

FIG. 2 illustrates an example detailed diagram of a switch circuit in the display control circuit in FIG. 1 according to an embodiment of the present disclosure. As shown in FIG. 2, the switch circuit may be an N-channel MOSFET transistor (for example, SC-75A or SC-89) having three pins. A first pin G of the switch circuit is connected to the control terminal CON to receive the control signal Control. A second pin S of the switch circuit is connected to the power supply signal terminal IOVCC to receive the operating power supply voltage IOvcc. A third pin D of the switch circuit is configured to output the operating power supply voltage IOvcc. The switch circuit outputs the operating power supply voltage IOvcc under the control of the control signal Control. Specifically, when the control signal Control is at a high level, the switch circuit is turned on to output the operating power supply voltage IOvcc via the third pin D. When the control signal Control is at a low level, the switch circuit is turned off to stop outputting the operating power supply voltage IOvcc.

By taking SC-75A as an example, the transistor is an NMOSFET transistor with a maximum gate voltage being 6V, a number of pins being 3, a maximum power consumption being 0.3 W, a typical turn-off delay time being 50 ns, a typical turn-on delay time being 50 ns, a maximum operating temperature being +155 degrees Celsius, and a minimum operating temperature being −55 degrees Celsius. Therefore, the transistor can satisfy the performance requirements for the display control circuit according to the embodiment of the present disclosure. It is to be noted, however, that the type of the transistor mentioned in the above embodiments of the present disclosure is not limited to the N-type, and the transistor may also be a P-type transistor. In a specific implementation, a source and a drain of each of these transistors have interchangeable functions depending on the type of transistor and an input signal, and are not specifically distinguished here. In the following embodiments, the switch transistor which is an N-type transistor is described as an example, that is, when a gate voltage of the switch transistor is at a high level, the switch transistor is turned on, and when the gate voltage is at a low level, the switch transistor is turned off. It will be understood by those skilled in the art that a P-type transistor may be used as a switch transistor, that is, when a gate voltage of the switch transistor is at a low level, the switch transistor is turned on, and when the gate voltage is at a high level, the switch transistor is turned off. In this case, corresponding modifications to the structure will be apparent to those skilled in the art.

In the present embodiment, the switch circuit serves to control turn-on and turn-off of the operating power supply voltage output to the display control circuit. The switch circuit is controlled to be turned on and turned off via high and low levels of the control signal, so as to control enablement and disablement of power supply to the display driving circuit subsequently.

Figure 3:
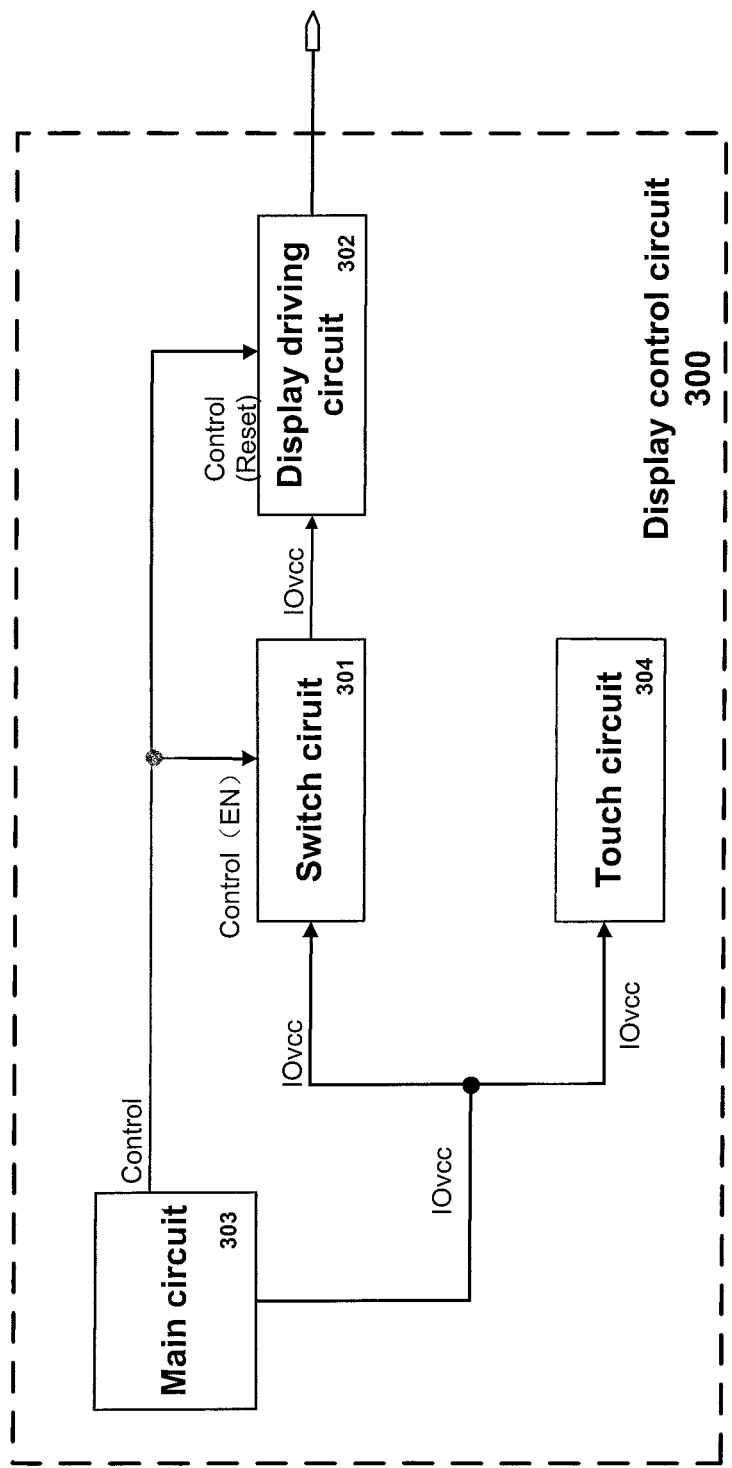
FIG. 3 is a schematic block diagram of a display control circuit according to another embodiment of the present disclosure.

FIG. 3 is a schematic block diagram of a display control circuit 300 according to another embodiment of the present disclosure. The display control circuit 300 comprises a switch circuit 301, a display driving circuit 302, a main circuit 303 and a touch circuit 304.

The switch circuit 301 has a first signal input terminal connected to a control terminal CON and configured to receive a control signal Control, a second signal input terminal connected to a power supply signal terminal IOVCC and configured to receive an operating power supply voltage IOvcc, and a power supply signal output terminal configured to output the operating power supply voltage IOvcc.

The display driving circuit 302 has a first signal input terminal connected to the control terminal CON and configured to receive the control signal Control, a power supply signal input terminal connected to the power supply signal output terminal of the switch circuit 301 and configured to receive the operating power supply voltage IOvcc, and a driving signal output terminal configured to output a driving signal.

In the embodiment of the present disclosure, the switch circuit 301 is configured to output the operating power supply voltage IOvcc received by the second signal input terminal thereof from the power supply signal terminal IOVCC to the display driving circuit 302 under the control of the control terminal CON. Specifically, the switch circuit 301 is turned on when the control signal Control is at a first level to output the operating power supply voltage IOvcc to the display driving circuit 302 and is turned off when the control signal Control is at a second level to stop outputting the operating power supply voltage IOvcc to the display driving circuit 302.

The main circuit 303 comprises the control terminal configured to provide the control signal Control to the switch circuit 301 and the display driving circuit 302; and the power supply signal terminal IOVCC configured to provide the operating power supply voltage IOvcc to the switch circuit 301. In the present embodiment, when the display driving circuit 302 enters the sleep-in mode, the display driving circuit 302 sometimes may enter an abnormal state due to some other factors (such as an abnormal power-down condition caused by switching between power supplies), and the main circuit switches the control signal Control from a first level (for example, a high level) to a second level (for example, a low level) via the control terminal CON, so that the switch circuit 301 is turned off to stop outputting the operating power supply voltage IOvcc to the display driving circuit 302. In this way, the display driving circuit 302 can be released from the abnormal state. When the display driving circuit 302 is waken up, the main circuit 303 switches the control signal Control from the second level to the first level via the control terminal CON so that the switch circuit 301 is turned on to output the operating power supply voltage IOvcc to the display driving circuit 302. In this way, the main circuit 303 may supply power to the display driving circuit 302 through the switch circuit 301. Further, when the control signal is switched from the second level to the first level, the display driving circuit 302 is reset in response to the switching of the control signal. For example, in a case that the first level is a high level and the second level is a low level, a falling edge of the control signal from the high level to the low level may trigger the display driving circuit 302 to be reset. It will be understood by those skilled in the art that there may be a number of ways to achieve the above reset operation. According to the embodiment of the present disclosure, the switch circuit 301 and the display driving circuit 302 share the control signal Control provided by the main circuit 303. For the switch circuit 301, the control signal Control corresponds to an enabling signal for controlling turn-on/turn-off of the switch circuit 301. For the display driving circuit 302, the control signal Control corresponds to a reset signal for controlling the reset operation of the display driving circuit 302.

The touch circuit 304 comprises a voltage signal input terminal connected to the power supply signal terminal IOVCC and configured to multiplex the operating power supply voltage IOvcc provided by the main circuit 303 with the display driving circuit 302. The touch circuit 304 may receive and process a touch signal. In the conventional technique, the main circuit 303 supplies the operating power supply voltage IOvcc directly to the display driving circuit 302 and the touch circuit 304, respectively, so that the touch circuit 304 may multiplex the operating power supply voltage IOvcc with the display driving circuit 302. Therefore, the main circuit 303 cannot but supply the operating power supply voltage IOvcc even if the display driving circuit 302 is in an abnormal state due to entering the sleep-in mode. If the operating power supply voltage IOvcc is not provided in order to release the display driving circuit 302 from the abnormal state, the touch circuit 304 cannot operate normally. In the embodiment of the present disclosure, power supply to the display driving circuit 302 is controlled to be disabled when the display driving circuit 302 is in a sleep-in mode and is controlled to be enabled when the display driving circuit 302 is in a wakeup mode by providing the switch circuit 301 between the main circuit 303 and the display driving circuit 302 and turning on and turning off the switch circuit 301. In this way, it prevents the display apparatus from having a black screen or undesirable abnormal display during a restart process. Further, the main circuit 303 can continue to supply power to the touch circuit 304 when the power supply to the display driving circuit 302 is disabled, so that the touch circuit 304 operates normally.

In the present embodiment, the switch circuit 301 may be an NMOS transistor or a PMOS transistor. The display driving circuit 302 may comprise a digital circuit, a shift register, and an internal boost module. The display control circuit 300 may comprise one or more display driving circuits described above. The display driving circuit is not limited to an amorphous Silicon (a-Si) material, and may be an Low Temperature Poly-Silicon (LTPS) and other materials. The main circuit 303 may comprise a CPU and a memory for transmitting instructions to respective circuits and processing feedback signals. A shape of the main circuit 303 is not limited to a rectangular shape, and may be any shape.

Figure 4:
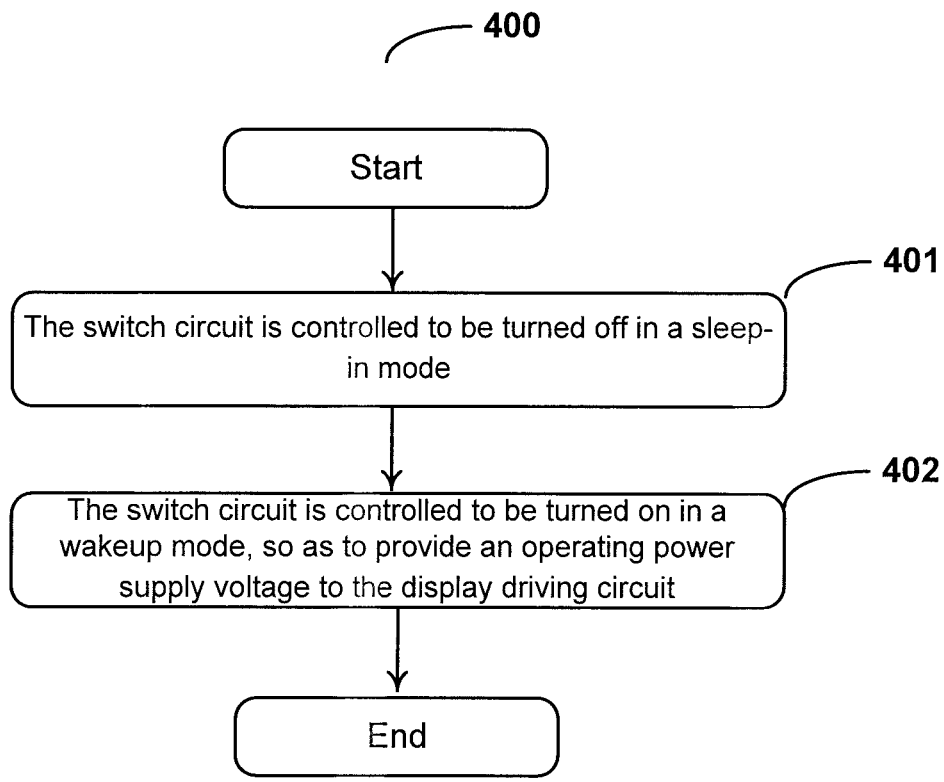
FIG. 4 is a flowchart of a display control method according to an embodiment of the present disclosure.

Next, a flowchart of a display control method 400 according to an embodiment of the present disclosure will be described with reference to FIG. 4. As shown in FIG. 4, the display control method 400 according to the embodiment of the present disclosure may comprise the following steps.

In step 401, the switch circuit is controlled to be turned off in a sleep-in mode.

In step 402, the switch circuit is controlled to be turned on in a wakeup mode, so as to provide an operating power supply voltage to the display driving circuit.

Specifically, step 401 comprises switching a control signal provided via the control terminal from a first level to a second level. Step 402 comprises switching the control signal from the second level to the first level. The display driving circuit is further controlled to be reset when the control signal is switched from the second level to the first level.

It should be noted that sequence numbers of the various steps in the above method are used only as representations of the steps for description and should not be considered as an execution order of the respective steps. Unless otherwise stated, the method does not need to be performed in exactly the order as shown.

In the present embodiment, when the display driving circuit in the display apparatus is in the sleep-in mode, the control signal is switched from the first level (for example, a high level) to the second level (for example, a low level). In the sleep-in mode, if the display driving circuit enters an abnormal state due to other factors (for example, an abnormal power-down condition caused by switching between power supplies), the operating voltage provided to the display driving circuit may be turned off in synchronization with the control signal Control being set to the second level (for example, a low level). Due to the isolation of the switching circuit, the operating power supply voltage supplied by the main circuit may normally supply power to other modules (for example, the touch circuit). When the display driving circuit is in the wake-up mode, the control signal is switched from the second level to the first level. The main circuit may provide the operating power supply voltage to the display driving circuit through the switch circuit, and therefore the display apparatus can be waked up normally without undesirable display.

In addition, it will be understood by those skilled in the art that power supply to both of the display driving circuit and the touch module (or another circuit) is achieved when the main circuit outputs a control signal at the first level (for example, a high level).

Figure 5:
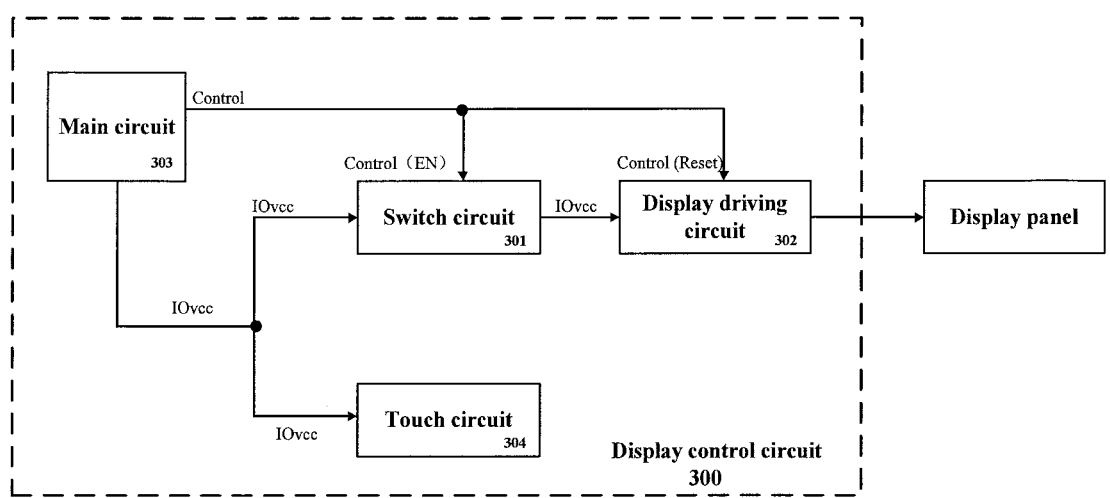
FIG. 5 illustrates a schematic block diagram of a display apparatus according to an embodiment of the present disclosure.

According to another embodiment of the present disclosure, there is also proposed a display apparatus comprising a display panel and the display control circuit described above, as shown in FIG. 5. The display driving circuit in the display control circuit is configured to supply a driving signal to the display panel via the driving signal output terminal of the display driving circuit.

In the present embodiment, the display panel may be a Thin Film Transistor-Liquid Crystal Display (TFT-LCD) panel, an Organic Light Emitting Diode (OLED) panel, or a LTPS panel.

The display apparatus according to the embodiment of the present disclosure may be any display product or component having a display function, such as a smart phone, a flat Personal Computer (PC), a mobile phone, a video telephone, an e-book reader, a desktop PC, a laptop PC, a notebook computer, a Personal Digital Assistant (PDA), a Portable Multimedia Player (PMP), a MP3 player etc.

The foregoing detailed description has set forth multiple embodiments of the display control circuit and the display control method via the use of block diagrams, flowcharts, and/or examples. In a case that such block diagrams, flowcharts, and/or examples contain one or more functions and/or operations, it will be understood by those skilled in the art that each function and/or operation within such block diagrams, flowcharts or examples may be implemented, individually and/or collectively, by a wide range of hardware, software, firmware, or virtually any combination thereof. In one embodiment, several portions of the subject matter described in the embodiments of the present disclosure may be implemented via Application Specific Integrated Circuits (ASICs), Field Programmable Gate Arrays (FPGAs), Digital Signal Processors (DSPs), or other integrated formats. However, those skilled in the art will recognize that some aspects of the embodiments disclosed herein, in whole or in part, may be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and/or firmware would be well within the skill of those skilled in the art in ray of this disclosure. In addition, those skilled in the art will appreciate that the mechanisms of the subject matter described herein are capable of being distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a floppy disk, a hard disk drive, a Compact Disc (CD), a Digital Versatile Disk (DVD), a digital tape, a computer memory, etc.; and a transmission type medium such as a digital and/or an analog communication medium (e.g., a fiber optic cable, a waveguide, a wired communications link, a wireless communication link, etc.).

While the present disclosure has been described with reference to several typical embodiments, it is apparent to those skilled in the art that the terms are used for illustration and explanation purpose and not for limitation. The present disclosure may be practiced in various forms without departing from the spirit or essence of the present disclosure. It should be understood that the embodiments are not limited to any of the foregoing details, and shall be interpreted broadly within the spirit and scope as defined by the following claims. Therefore, all of modifications and alternatives falling within the scope of the claims or equivalents thereof are to be encompassed by the claims as attached.

We claim:

1. A display control circuit, comprising:
    a switch circuit having a first signal input terminal connected to a control terminal, a second signal input terminal connected to a power supply signal terminal, and a power supply signal output terminal; and
    a display driving circuit having a first signal input terminal connected to the control terminal, a power supply signal input terminal connected to the power supply signal output terminal of the switch circuit, and a driving signal output terminal,
    wherein the switch circuit is configured to receive an operating power supply voltage from the power supply signal terminal via the second signal input terminal and output the operating power supply voltage to the display driving circuit via the power supply signal output terminal under the control of the control terminal.

2. The display control circuit according to claim 1, further comprising a main circuit including:
    the control terminal, configured to provide a control signal to the switch circuit and the display driving circuit; and
    the power supply signal terminal, configured to provide the operating power supply voltage.

3. The display control circuit according to claim 2, wherein the main circuit is configured to:
    control the switch circuit to be turned off via the control terminal in a sleep-in mode; and
    control the switch circuit to be turned on via the control terminal in a wakeup mode.

4. The display control circuit according to claim 3, wherein the switch circuit is configured to:
    output the operating power supply voltage to the display driving circuit when the switch is turned on, and
    stop outputting the operating power supply voltage to the display driving circuit when the switch circuit is turned off.

5. A display apparatus comprising a display panel and the display control circuit according to claim 3, wherein the display driving circuit is configured to provide a driving signal to the display panel via the driving signal output terminal of the display driving circuit.

6. A display apparatus comprising a display panel and the display control circuit according to claim 4, wherein the display driving circuit is configured to provide a driving signal to the display panel via the driving signal output terminal of the display driving circuit.

7. The display control circuit according to claim 2, wherein the main circuit is further configured to control the display driving circuit to be reset via the control terminal.

8. The display control circuit according to claim 2, further comprising a touch circuit including:
    a voltage signal input terminal connected to the power supply signal terminal and configured to receive the operating power supply voltage from the main circuit.

9. A display control method applicable to the display control circuit according to claim 8, comprising:
    controlling the switch circuit to be turned off in a sleep-in mode; and
    controlling the switch circuit to be turned on in a wakeup mode, so as to provide an operating power supply voltage to the display driving circuit.

10. The display control method according to claim 9, wherein
    controlling the switch circuit to be turned off comprises switching a control signal provided via the control terminal from a first level to a second level;
    controlling the switch circuit to be turned on comprises: switching the control signal from the second level to the first level.

11. The display control method according to claim 10, wherein when the control signal is switched from the second level to the first level, the display driving circuit is reset.

12. A display control method applicable to the display control circuit according to claim 2, comprising:
    controlling the switch circuit to be turned off in a sleep-in mode; and
    controlling the switch circuit to be turned on in a wakeup mode, so as to provide an operating power supply voltage to the display driving circuit.

13. The display control method according to claim 12, wherein
    controlling the switch circuit to be turned off comprises switching a control signal provided via the control terminal from a first level to a second level;
    controlling the switch circuit to be turned on comprises: switching the control signal from the second level to the first level.

14. The display control method according to claim 13, wherein when the control signal is switched from the second level to the first level, the display driving circuit is reset.

15. A display apparatus comprising a display panel and the display control circuit according to claim 2, wherein the display driving circuit is configured to provide a driving signal to the display panel via the driving signal output terminal of the display driving circuit.

16. The display control circuit according to claim 1, wherein the switch circuit comprises an NMOS transistor or a PMOS transistor.

17. A display control method applicable to the display control circuit according to claim 1, comprising:
    controlling the switch circuit to be turned off in a sleep-in mode; and
    controlling the switch circuit to be turned on in a wakeup mode, so as to provide an operating power supply voltage to the display driving circuit.

18. The display control method according to claim 17, wherein
    controlling the switch circuit to be turned off comprises: switching a control signal provided via the control terminal from a first level to a second level;
    controlling the switch circuit to be turned on comprises: switching the control signal from the second level to the first level.

19. The display control method according to claim 18, wherein when the control signal is switched from the second level to the first level, the display driving circuit is reset.

20. A display apparatus comprising a display panel and the display control circuit according to claim 1, wherein the display driving circuit is configured to provide a driving signal to the display panel via the driving signal output terminal of the display driving circuit.

* * * * *